US007692847B2

(12) United States Patent
Kurosawa

(10) Patent No.: US 7,692,847 B2
(45) Date of Patent: Apr. 6, 2010

(54) ELECTROPHORESIS DISPLAY AND ELECTRONIC APPARATUS INCLUDING AN ELECTROPHORESIS DISPLAY

(75) Inventor: Hirofumi Kurosawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/335,447

(22) Filed: Dec. 15, 2008

(65) Prior Publication Data
US 2009/0153947 A1 Jun. 18, 2009

(30) Foreign Application Priority Data
Dec. 18, 2007 (JP) ............................. 2007-325925

(51) Int. Cl.
*G02B 26/00* (2006.01)
(52) U.S. Cl. ..................................... 359/296
(58) Field of Classification Search ............... 359/296, 359/228; 345/107; 349/149, 86, 152; 439/638
See application file for complete search history.

(56) References Cited
U.S. PATENT DOCUMENTS
3,756,693 A * 9/1973 Ota ........................... 345/107

4,062,009 A * 12/1977 Raverdy et al. ............... 345/48
4,068,927 A * 1/1978 White ......................... 359/296
6,066,364 A * 5/2000 Blass et al. .................. 427/201
6,798,470 B2 * 9/2004 Iwanaga et al. ............... 349/86
7,355,784 B2 * 4/2008 Kim ........................... 359/296
7,375,875 B2 * 5/2008 Whitesides et al. .......... 359/296

FOREIGN PATENT DOCUMENTS
JP       2005-114822 A    4/2005
JP       2006-323026 A    11/2006
JP       2007-200291 A    8/2007

* cited by examiner

*Primary Examiner*—Chandrika Prasad
(74) *Attorney, Agent, or Firm*—AdvantEdge Law Group, LLC

(57) ABSTRACT

An electrophoresis display includes an element substrate; a counter substrate; an electrophoresis layer sandwiched between the element substrate and the counter substrate; and a driver circuit disposed in an area of the element substrate that is outside a display area. In this electrophoresis display, the counter substrate overlaps the display area and at least part of an area of the element substrate where the driver circuit is disposed.

10 Claims, 4 Drawing Sheets

ELECTROPHORESIS DISPLAY AND ELECTRONIC APPARATUS INCLUDING AN ELECTROPHORESIS DISPLAY

BACKGROUND

1. Technical Field

The present invention relates to an electrophoresis display and an electronic apparatus.

2. Related Art

An existing electrophoresis display includes an electrophoresis layer which is sandwiched between an element substrate and a counter substrate.

FIG. 7 is a plan view showing a structure of an electrophoresis display 201, and FIG. 8 is a sectional view taken along line VIII-VIII of FIG. 7. Referring to FIGS. 7 and 8, the electrophoresis display 201 has a structure in which a counter substrate 203 covers a display area 205 of an element substrate 202. Driver circuits 222 and 223, wiring, and the like are disposed in an area of the element substrate 202 that is outside the display area 205.

The counter substrate 203 side of the electrophoresis display 201 corresponds to the display surface side. A protective substrate 207 is disposed on a surface 203a of the counter substrate 203 to protect the display surface. The counter substrate 203 and the protective substrate 207 are glued with a transparent adhesive 208b. According to JP-A-2005-114822, the space around the outer edge of the counter substrate 203 between the protective substrate 207 and the element substrate 202 is sealed with a sealant 208a made of, for example, a resin material. As shown in FIGS. 7 and 8, the sealant 208a is disposed not only on the peripheral portions of the element substrate 202 and the protective substrate 207 but also in an area where the driver circuits 222 and 223, wiring, and the like are disposed.

However, the linear expansion coefficient of a resin material used for the sealant 208a is normally higher than that of a material used for the element substrate 202 and the protective substrate 207. Thus, in conducting a thermal shock test at −20° C. to 85° C., the difference between the linear expansion coefficients causes the formation of a local stress between the element substrate 202 and the sealant 208a, which sometimes adversely affects components disposed on the element substrate 202 such as driver circuits, wiring, and the like. In particular, the formation of a large stress possibly changes the characteristics of driver circuits, and in other cases, causes local separation between the element substrate 202 and the sealant 208a, which results in breakdown of the driver circuits.

SUMMARY

An advantage of some aspects of the invention is that it provides an electrophoresis display and an electronic apparatus with high reliability.

To achieve the advantage described above, an electrophoresis display according to a first aspect of the invention includes an element substrate; a counter substrate; an electrophoresis layer sandwiched between the element substrate and the counter substrate; and a driver circuit disposed in an area of the element substrate that is outside a display area. In this electrophoresis display, the counter substrate overlaps the display area and at least part of an area of the element substrate where the driver circuit is disposed.

According to the first aspect of the invention, since the driver circuit is disposed in the area of the element substrate that is outside the display area and the counter substrate overlaps the display area and at least part of the area of the element substrate where the driver circuit is disposed, the counter substrate protects at least part of the area where the driver circuit is disposed. In the case that a layer with a high thermal expansion coefficient is to be disposed in an area that overlaps the driver circuit when viewed in plan, the layer is disposed on the counter substrate. Thus, the layer with a high thermal expansion coefficient is prevented from being formed directly with the driver circuit. In the case that a thermal shock causes the formation of a stress between the element substrate and the layer, the stress does not affect the components disposed on the element substrate, thus realizing an electrophoresis display with high reliability.

In the electrophoresis display described above, it is preferable that the counter substrate, when viewed in plan, overlap about two thirds or more of the area where the driver circuit is disposed. In this case, the driver circuit is protected with higher reliability.

In the electrophoresis display described above, it is preferable that the counter substrate, when viewed in plan, overlap the entire area where the driver circuit is disposed. In this case, the area where the driver circuit is disposed is completely protected. This prevents the components from being affected by thermal shock.

In the electrophoresis display described above, it is preferable that a protective substrate be disposed on a surface of the counter substrate to protect the surface, and a sealant is disposed between the element substrate and the protective substrate.

In this case, in disposing the sealant in the area that overlaps the driver circuit in plan view, the sealant is disposed on the counter substrate that overlaps the driver circuit. Therefore, even if the sealant swells due to heat, the driver circuit is not affected by the heat.

An electrophoresis display according to a second aspect of the invention includes an element substrate; a counter substrate; an electrophoresis layer sandwiched between the element substrate and the counter substrate; a driver circuit disposed in an area of the element substrate that is outside a display area; and a protective layer disposed so as to overlap at least part of an area of the element substrate where the driver circuit is disposed.

According to the second aspect of the invention, since the driver circuit is disposed in the area of the element substrate that is outside the display area and the protective layer is disposed so as to overlap at least part of the area of the element substrate where the driver circuit is disposed, the protective layer protects at least part of the area where the driver circuit is disposed. In the case that a layer with a high thermal expansion coefficient is to be disposed in an area that overlaps the driver circuit when viewed in plan, the layer is disposed on the protective substrate. Thus, the layer with a high thermal expansion coefficient is not formed so as to be in contact with the driver circuit. In the case that a thermal shock causes the formation of a stress between the element substrate and the layer, the stress does not affect the components disposed on the element substrate, thus providing an electrophoresis display with high reliability. Furthermore, the components disposed on the element substrate can be prevented from being affected without increasing the size of the counter substrate in this embodiment. Thus, the area (frame area) that is outside the display area does not need to be extended.

In the electrophoresis display described above, it is preferable that the protective layer include a plurality of sublayers. This more effectively prevents the components from being affected by thermal shock.

In the electrophoresis display described above, it is preferable that a linear expansion coefficient of the protective layer gradually decrease from a counter substrate side to an element substrate side.

In this case, the closer to the element substrate, the smaller the effect caused by thermal expansion becomes. This suppresses the effect on the element substrate due to thermal expansion. When the protective layer is a single layer, the protective layer can be structured such that the linear expansion coefficient gradually decreases. When the protective layer includes a plurality of sublayers, the protective layer may be structured such that the linear expansion coefficient decreases stepwise layer-by-layer or the sublayers may be formed such that the linear expansion coefficients of the sublayers continuously decrease from the upper side to the lower side. In differentiating the linear expansion coefficients, for example, the linear expansion coefficients are decreased by adding an inorganic filler such as silica or an organic filler such as rubber to the protective layer.

An electronic apparatus according to an aspect of the invention includes the electrophoresis apparatus described above.

This provides an electronic apparatus with excellent durability because the electronic apparatus includes an electrophoresis display that protects components disposed on an element substrate from being damaged.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
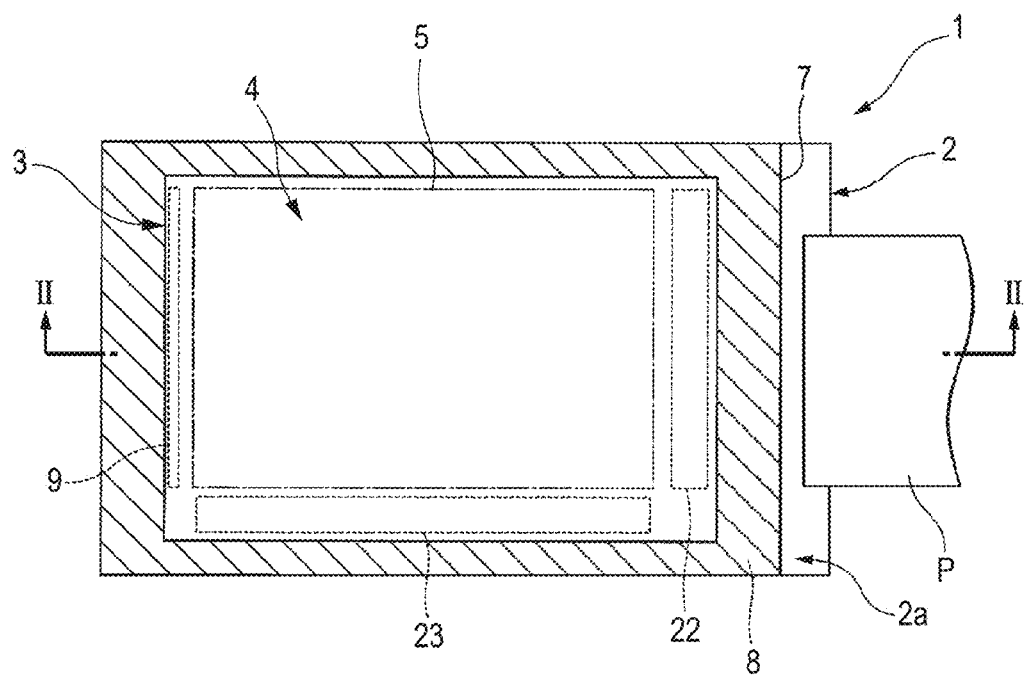
FIG. 1 is a plan view showing a structure of an electrophoresis display according to a first embodiment of the invention.
Figure 2:
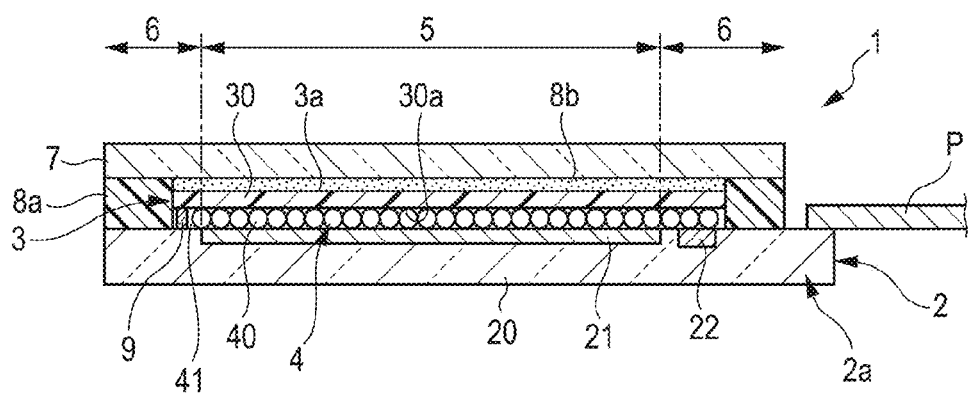
FIG. 2 is a sectional view showing a structure of an electrophoresis display according to an embodiment.

A first embodiment of the invention will be described with reference to drawings. FIG. 1 is a plan view showing a general structure of an electrophoresis display 1 according to this embodiment. FIG. 2 is a sectional view taken along line II-II of FIG. 1.

Referring to FIGS. 1 and 2, the electrophoresis display 1 includes an element substrate 2, a counter substrate 3, and an electrophoresis layer 4. The electrophoresis layer 4 is sandwiched between the element substrate 2 and the counter substrate 3. In this electrophoresis display 1, images such as still images and moving images are displayed in a display area 5. A plurality of pixels, each of which has a displaying function, are arranged within the display area 5 in a matrix pattern. The outside area of the display area 5 is a non-display area 6 where such images are not displayed. No pixels are arranged in the non-display area 6; however, driver circuits, wiring, and the like are disposed in the non-display area 6.

A protective substrate 7 is disposed on an outer surface 3a side of the counter substrate 3 to protect the outer surface 3a. The space between the protective substrate 7 and the element substrate 2 is sealed with a sealant 8a. Glass with high transparency, excellent flatness, and scratch resistance may be suitable for the protective substrate 7. Examples of the glass include inorganic glass and crystal glass. Sapphire glass or acrylic glass may also be used. The protective substrate 7 and the counter substrate 3 are glued together with a transparent adhesive 8b.

The sealant 8a is made of a material such as an epoxy resin, an acrylic resin, or a silicon resin. The size of the element substrate 2 is larger than that of the counter substrate 3 in a horizontal direction of the drawings, thereby having an area that protrudes from the counter substrate 3, which is hereinafter referred to as a protruding area 2a. A flexible substrate P for electrical connection to external circuits is disposed in the protruding area 2a.

The electrophoresis layer 4 is sandwiched between the element substrate 2 and the counter substrate 3, and is covered with the protective substrate 7. The outer edge of the electrophoresis layer 4 is sealed with the sealant 8a. Since the electrophoresis layer 4 that is vulnerable to moisture is covered in such a manner, the infiltration of moisture is prevented with certainty.

The element substrate 2 includes a rectangular substrate 20 where electrodes, elements, wiring, and the like necessary for driving the electrophoresis display 1 are disposed. The substrate 20 may be a glass substrate, a quartz substrate, a silicon substrate, a gallium arsenide substrate, or a plastic substrate (resin substrate) made of a substance such as polyimide, polyethylene terephthalate (PET), polyethylene naphthalate (PEN), polymethyl methacrylate (PMMA), polycarbonate (PC), polyethersulfone (PES), or aromatic polyester (liquid crystal polymer). Pixel electrodes and switching elements provided to the individual pixels and a driving layer 21 having data lines, scanning lines, and the like that are connected to the switching elements are disposed in the area of the substrate 20 that corresponds to the display area 5. A driver circuit 23 connected to the data lines and a driver circuit 22 connected to the scanning lines are disposed in the area of the substrate 20 that corresponds to the non-display area 6.

The electrophoresis layer 4 is sandwiched between the element substrate 2 and the counter substrate 3, and the outer surface 3a side of the counter substrate 3 corresponds to the screen side of the electrophoresis display 1. The counter substrate 3 includes a rectangular substrate 30 made of a highly transparent material such as polyethylene terephthalate (PET), polyethersulfone (PES), or polycarbonate (PC). A common electrode is disposed so as to cover almost all of the inner surface 30a of the substrate 30. The common electrode is made of a highly transparent conductive material such as indium tin oxide (ITO). The counter substrate 3 is disposed so as to cover, when viewed in plan, the area of the element substrate 2 that corresponds to the display area 5 and the area of the non-display area 6 of the element substrate 2 that includes the driver circuit 22 and the driver circuit 23. The common electrode of the counter substrate 3 is connected to the element substrate 2 via a vertically conducting member 9. The electrophoresis layer 4 is sandwiched between the pixel electrodes of the element substrate 2 and the common electrode of the counter substrate 3. The electrophoresis layer 4 includes a plurality of microcapsules 40 and a binder 41. The electrophoresis layer 4 is arranged, when viewed in plan, so as to cover almost all of the area where the counter substrate 3 is disposed and also the area of the element substrate 2 where the driver circuit 22 and the driver circuit 23 are included. Each of the microcapsules 40 is a generally spherical capsule in which an electrophoresis dispersion solution is encapsulated. The diameters of the microcapsules 40 are substantially the same (from 50 μm to 100 μm). The wall membrane of each of the microcapsules 40 is made of a compound such as an Arabian gum-gelatin composite membrane, a urethane resin, or a urea resin. The electrophoresis dispersion solution encapsulated in the microcapsules 40 is constituted by electrophoresis particles and a liquid-phase dispersion medium in which the electrophoresis particles are dispersed.

The liquid-phase dispersion medium may be one or mixture of water, an alcohol solvent, an ester, a ketone, an aliphatic hydrocarbon, an alicyclic hydrocarbon, an aromatic hydrocarbon, a halogenated hydrocarbon, a carboxylate, and other fats and oils. The liquid-phase dispersion medium may contain a surfactant or the like.

Organic or inorganic particles (polymers or colloids) that migrate by electrophoresis when a potential difference is applied in the liquid-phase dispersion medium can be used as the electrophoresis particles. Examples of the particles include black pigments such as carbon black and aniline black, white pigments such as titanium dioxide, yellow pigments such as mono azo pigments and isoindolinone, red pigments such as mono azo pigments and quinacridone red, blue pigments such as phthalocyanine blue, and green pigments such as phthalocyanine green. These pigments may be used alone or in combination. If necessary, a charge control agent constituted by particles of an electrolyte, a surfactant, a metallic soap, a resin, a rubber, an oil, a varnish, or a compound; a dispersing agent such as a titanium coupling agent, an aluminum coupling agent, or a silane coupling agent; a lubricant; or a stabilizing agent can be added to the pigments.

For example, two types of electrophoresis particles, titanium dioxide (white pigment) and carbon black (black pigment), are encapsulated in each of the microcapsules 40. One of them is negatively charged and the other is positively charged. Obviously, other electrophoresis particles may be used. Alternatively, only one type of electrophoresis particles may be used to display images by enabling the particles to migrate toward the common electrode side or the pixel electrode side.

The binder 41 is a member that secures the plurality of microcapsules 40 onto the counter substrate 3 in particular. The binder 41 is preferably made of a material that has an excellent affinity for the wall membrane of the microcapsules 40, good adhesion to the common electrode, and insulation properties.

Next, the operation of the electrophoresis display 1 with the structure above will be described briefly. When a voltage is applied between the pixel electrodes and the common electrode such that the common electrode has a relatively high potential, positively charged black electrophoresis particles are attracted by Coulomb force to the pixel electrode side in the microcapsules 40. On the other hand, negatively charged white electrophoresis particles are attracted by Coulomb force to the common electrode side in the microcapsules 40. As a result, the white electrophoresis particles gather on the counter substrate 3 side in the microcapsules 40, whereby a white color, which is a color of the white electrophoresis particles, is displayed on the display area 5 of the electrophoresis display 1.

In contrast, when a voltage is applied between the pixel electrodes and the common electrode such that the pixel electrodes have a relatively high potential, negatively charged white electrophoresis particles are attracted by Coulomb force to the pixel electrode side. On the other hand, positively charged black electrophoresis particles are attracted by Coulomb force to the common electrode side. As a result, the black electrophoresis particles gather on the counter substrate 3 side in the microcapsules 40, whereby a black color, which is a color of the black electrophoresis particles, is displayed on the display area 5 of the electrophoresis display 1.

According to this embodiment, even if the electrophoresis display 1 is exposed to an environment where its operating temperature changes significantly, direct contact between the driver circuits 22 and 23 and the sealant 8a can be prevented because the counter substrate 3 covers the driver circuits 22 and 23 disposed on the non-display area 6. Therefore, even if a thermal shock causes the formation of a stress between the element substrate 2 and the sealant 8a, the stress does not affect the driver circuits 22 and 23, thus realizing the electrophoresis display 1 with high reliability. In particular, this structure is effective in the case where the element substrate 2 is made of glass having a thermal expansion coefficient significantly different from that of the sealant 8a.

Second Embodiment

Figure 3:
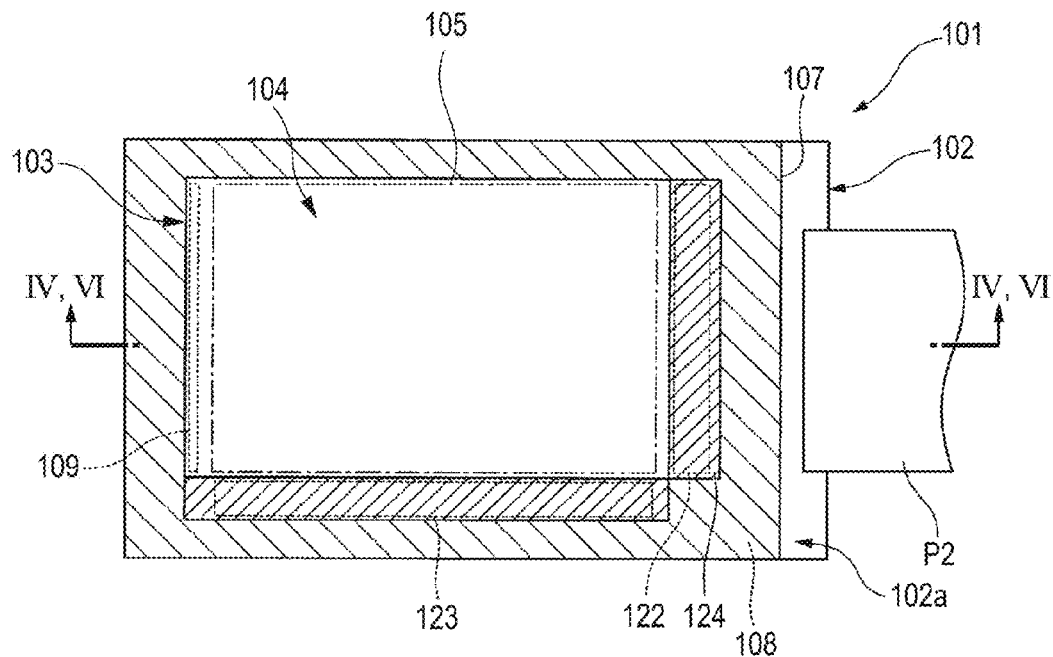
FIG. 3 is a plan view showing a structure of an electrophoresis display according to a second embodiment of the invention.
Figure 4:
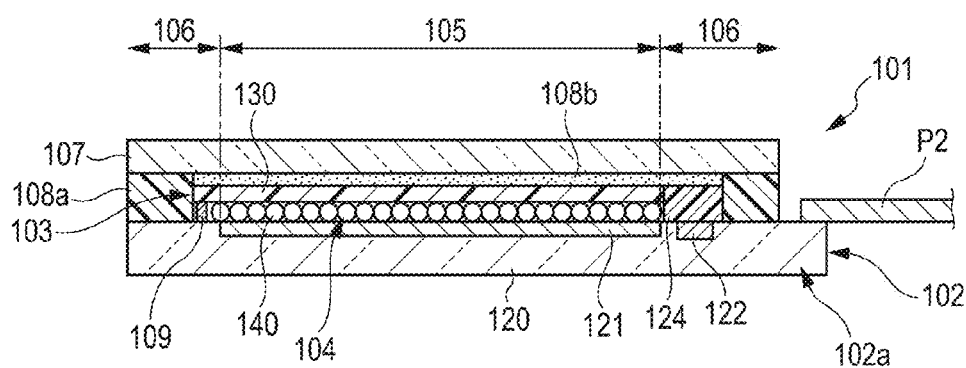
FIG. 4 is a sectional view showing a structure of an electrophoresis display according to an embodiment.

Next, a second embodiment of the invention will be described. FIG. 3 is a plan view showing a structure of an electrophoresis display 101 according to this embodiment, which corresponds to FIG. 1 in the first embodiment. FIG. 4 is a sectional view taken along line IV-IV of FIG. 3, which corresponds to FIG. 2 in the first embodiment. In this embodiment, only the structure of an element substrate 102 is different compared with the first embodiment.

Specifically, a counter substrate 103 is disposed so as to substantially overlap a display area 105 of the element substrate 102, and a protective layer 124 is disposed in an area of the element substrate 102 where a driver circuit 122 and a driver circuit 123 are disposed. The protective layer 124 may be made of a material having a linear expansion coefficient between that of the element substrate 102 and that of a sealant 108a. Examples of the material include resin materials that contain a large amount of filler. The protective layer 124 is disposed so as to be brought into contact with the sides of the counter substrate 103 and an electrophoresis layer 104. Thus, the electrophoresis layer 104 is sealed by the protective layer 124 and the sealant 108a. According to this embodiment, since the protective layer 124 is disposed so as to overlap the area of the element substrate 102 where the driver circuits 122 and 123 are disposed, the driver circuits 122 and 123 are protected by the protective layer 124. The sealant 108a is disposed on the protective layer 124, which can prevent direct contact between the driver circuits 122 and 123 and the sealant 108a with a high thermal expansion coefficient. Therefore, even if a thermal shock causes the formation of a stress between the element substrate 102 and the sealant 108a, the stress does not affect the driver circuits 122 and 123, thus realizing the electrophoresis display 1 with high reliability. In addition, damage to the components disposed on the element substrate 102 can be prevented without increasing the size of the counter substrate 103 in this embodiment. Thus, the area (frame area) of the counter substrate 103 that is outside the display area 105 does not need to be extended. In particular, this structure is effective in the case where the element substrate 102 is made of glass having a thermal expansion coefficient significantly different from that of the sealant 108a. The sealant 108a may be disposed between the protective layer 124 and a protective substrate 107. This structure also produces the effect described above.

Third Embodiment

Figure 5:
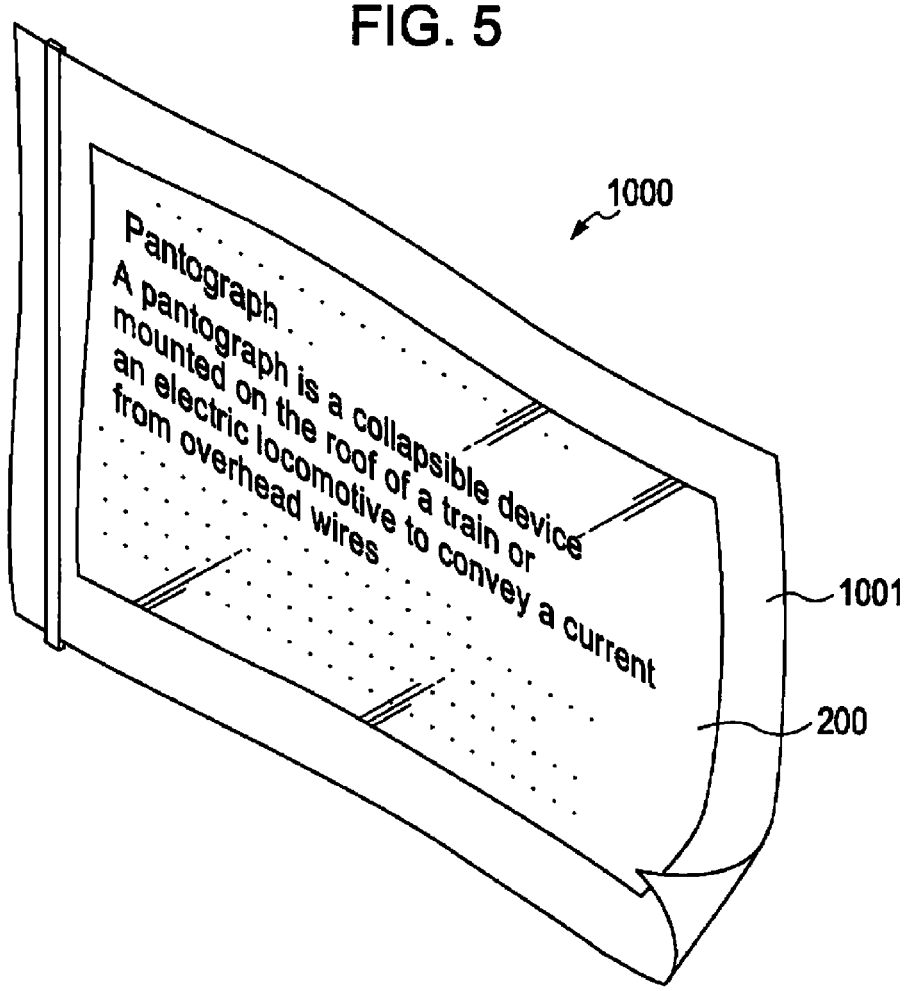
FIG. 5 is a perspective view showing a structure of an electrophoresis display according to a third embodiment of the invention.

Next, a third embodiment of the invention will be described. FIG. 5 is a perspective view showing a structure of electronic paper. A sheet of electronic paper 1000 includes the electrophoresis display 1 or 101 as a display section. The electronic paper 1000 has a display section 200 constituted by the electrophoresis display 1 or 101 on the top surface of a sheet body 1001 with texture and flexibility similar to existing paper. Since the electronic paper 1000 according to this embodiment includes the display section 200 constituted by the electrophoresis display 1 or 101 described above, the electronic paper 1000 itself also shows a stable displaying performance with high reliability.

Other examples of the electronic apparatus include liquid crystal televisions, viewfinder or direct-view videotape recorders, car navigation systems, pagers, electronic organizers, calculators, word processors, work stations, videophones, POS terminals, clocks, and devices with touch panels. The electrophoresis display 1 or 101 is applicable to a display section of such electronic apparatuses.

Technical scope of the invention is not limited to the embodiments described above and can be modified without departing from the scope of the invention.

Figure 6:
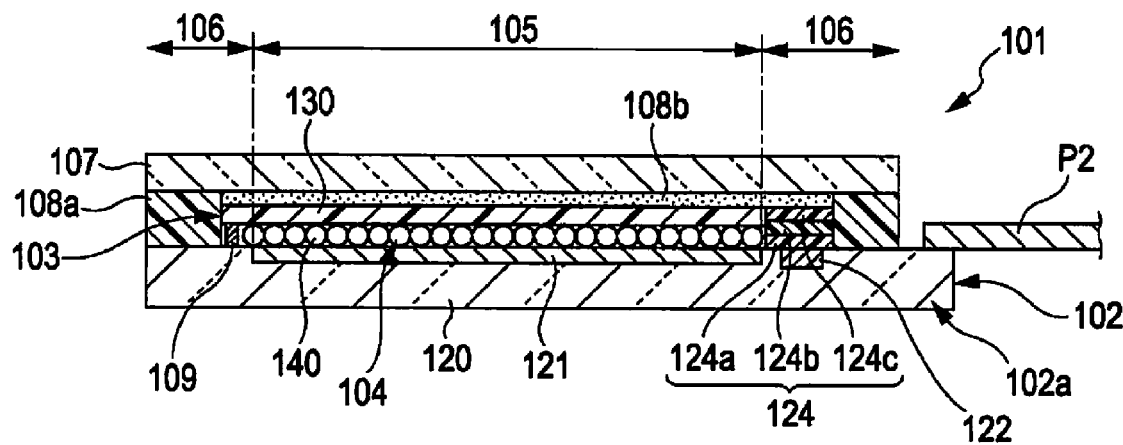
FIG. 6 is a sectional view showing another structure of an electrophoresis display according to an embodiment.
Figure 7:
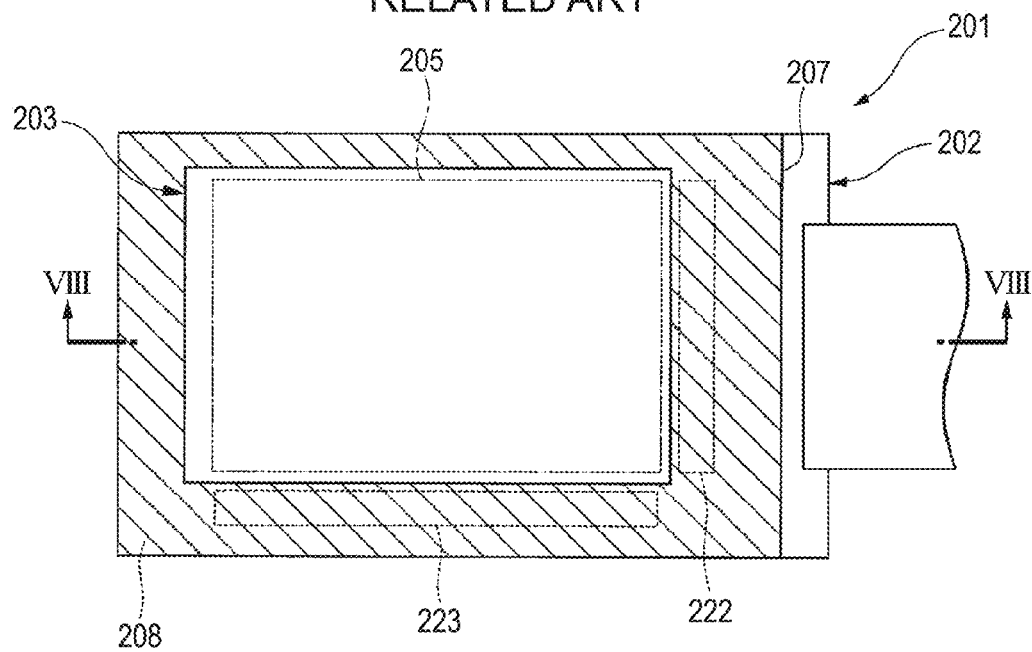
FIG. 7 is a plan view showing a structure of an existing electrophoresis display.
Figure 8:
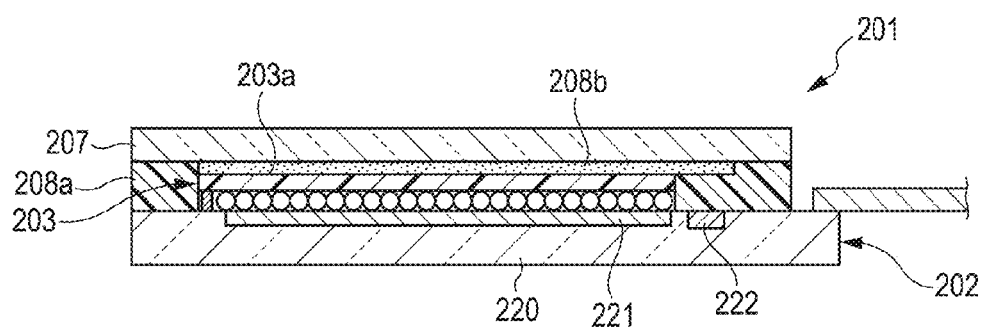
FIG. 8 is a sectional view showing a structure of an existing electrophoresis display.

In the second embodiment, for example, the protective layer 124 is a single layer. However, the invention is not limited to this, and the protective layer 124 may include a plurality of sublayers as shown in FIG. 6. FIG. 6 is a sectional view of the electrophoresis display 101 (taken along line VI-VI of FIG. 3), which corresponds to FIG. 4 in the second embodiment. Although the protective layer 124 has a three-sublayer structure of a lower sublayer 124a, a middle sublayer 124b, and an upper sublayer 124c in FIG. 6, the protective layer 124 may have two sublayers or four or more sublayers.

In FIG. 6, the materials of each sublayer of the protective layer 124 may be chosen so that their linear expansion coefficients gradually decrease from the upper sublayer 124c to the lower sublayer 124a. For example, the upper sublayer 124c, the middle sublayer 124b, and the lower sublayer 124a in FIG. 6 can be formed so that their linear expansion coefficients decrease stepwise layer-by-layer. The closer the layer is to the element substrate 102, the smaller its linear expansion coefficient becomes. Therefore, the effect due to thermal expansion can be minimized. Furthermore, instead of the method described above, the sublayers may be formed such that the linear expansion coefficients of the sublayers continuously decrease. In differentiating the linear expansion coefficients, the linear expansion coefficients can be decreased by adding an inorganic filler such as silica or an organic filler such as rubber to each sublayer of the protective layer 124. In particular, this structure is effective in the case where the element substrate 102 is made of glass having a thermal expansion coefficient significantly different from that of the sealant 108a. The sealant 108a may be disposed between the protective layer 124 and a protective substrate 107. This structure also produces the effect described above.

Although the counter substrate 3 is disposed so as to overlap the entire area where the driver circuits 22 and 23 are disposed in the first embodiment, the counter substrate 3 may overlap part of the area where the driver circuits 22 and 23 are disposed. In this case, the counter substrate 3 is preferably disposed so as to overlap two thirds or more of the area where the driver circuits 22 and 23 are disposed. This realizes the protection of the driver circuits 22 and 23 with higher reliability.

The entire disclosure of Japanese Patent Application No. 2007-325925, filed Dec. 18, 2007 is expressly incorporated by reference herein.

What is claimed is:

1. An electrophoresis display comprising:
    an element substrate;
    a counter substrate;
    an electrophoresis layer sandwiched between the element substrate and the counter substrate;
    a driver circuit disposed in an area of the element substrate that is outside a display are; and
    a sealant surrounding a side surface of the electrophoresis layer,
    wherein the electrophoresis layer overlaps the display area and at least part of an area of the element substrate where the driver circuit is disposed.

2. The electrophoresis display according to claim 1, wherein the electrophoresis layer, when viewed in plan, overlaps about two thirds or more of the area where the driver circuit is disposed.

3. The electrophoresis display according to claim 1, wherein the electrophoresis layer, when viewed in plan, overlaps the entire area where the driver circuit is disposed.

4. The electrophoresis display according to claim 1, further comprising a protective substrate disposed on a surface of the counter substrate to protect the surface and a sealant disposed between the element substrate and the protective substrate.

5. An electronic apparatus comprising the electrophoresis display according to claim 1.

6. An electrophoresis display comprising:
    an element substrate;
    a counter substrate;
    an electrophoresis layer sandwiched between the element substrate and the counter substrate;
    a driver circuit disposed in an area of the element substrate that is outside a display area; and
    a protective layer disposed so as to overlap at least part of an area of the element substrate where the driver circuit is disposed.

7. The electrophoresis display according to claim 6, wherein the protective layer includes a plurality of sublayers.

8. The electrophoresis display according to claim 6, wherein a linear expansion coefficient of the protective layer gradually decreases from a counter substrate side to an element substrate side.

9. The electrophoresis display according to claim 6, wherein the protective layer is disposed adjacent to the element substrate.

10. The electrophoresis display according to claim 6, further comprising a sealant surrounding a side surface of the electrophoresis layer and the protective layer.

* * * * *

UNITED STATES PATENT AND TRADEMARK OFFICE
CERTIFICATE OF CORRECTION

| | |
|---|---|
| PATENT NO. | : 7,692,847 B2 |
| APPLICATION NO. | : 12/335447 |
| DATED | : April 6, 2010 |
| INVENTOR(S) | : Hirofumi Kurosawa |

It is certified that error appears in the above-identified patent and that said Letters Patent is hereby corrected as shown below:

In Claim 1, column 8, line 21, change "are" to --area--.

Signed and Sealed this

First Day of June, 2010

David J. Kappos
*Director of the United States Patent and Trademark Office*